United States Patent [19]

Wakabayashi et al.

[11] Patent Number: 4,690,533
[45] Date of Patent: Sep. 1, 1987

[54] FILM FEEDING APPARATUS FOR CAMERA

[75] Inventors: Hiroshi Wakabayashi, Yokohama; Kazuyuki Kazami, Tokyo, both of Japan

[73] Assignee: Nippon Kogaku K. K., Tokyo, Japan

[21] Appl. No.: 797,970

[22] Filed: Nov. 14, 1985

[30] Foreign Application Priority Data

Dec. 4, 1984 [JP] Japan .................. 59-256281

[51] Int. Cl.⁴ .............................................. G03B 1/18
[52] U.S. Cl. ............................................... 354/173.11
[58] Field of Search ....................... 354/173.1, 173.11

[56] References Cited

U.S. PATENT DOCUMENTS 4,187,017  2/1980  Watanabe ............... 354/173.11
4,342,509  8/1982  Wakabayashi et al. ........... 354/173
4,363,544 12/1982  Nemoto et al. ............ 354/173.11 X
4,477,162 10/1984  Matsumoto ................ 354/173.11

FOREIGN PATENT DOCUMENTS 11989  5/1969  Japan .

Primary Examiner—W. B. Perkey
Attorney, Agent, or Firm—Shapiro and Shapiro

[57] ABSTRACT

A film feeding apparatus for a camera to feed a film from a cartridge is so structured that preparatory wind-up starts not immediately after a close signal indicating that a rear cover is closed is generated, but after a predetermined delay time elapses from generation of the close signal, i.e., after the rear cover is completely closed. The film feeding apparatus will not undesirably expose a film even if a rear cover detection switch is operated before a rear cover is completely closed.

12 Claims, 4 Drawing Figures

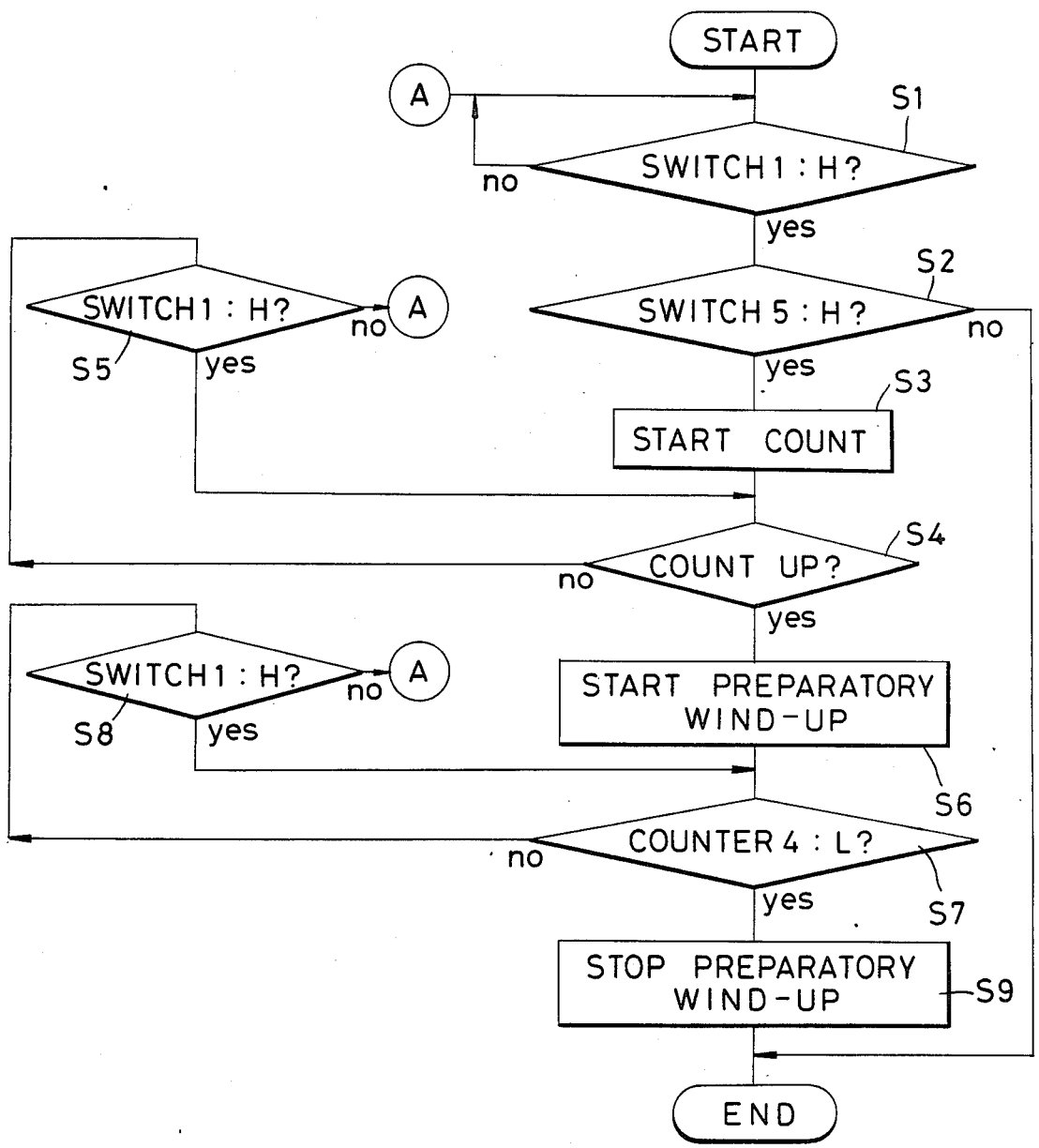

FILM FEEDING APPARATUS FOR CAMERA

BACKGROUND OF THE INVENTION

1. Field of the Invention

The present invention relates to a film feeding apparatus which is installed in a camera or is integrally or detachably mounted on a camera and, more particularly, to an apparatus for winding up a film stored in a cartridge by a driving force of a motor.

2. Description of the Prior Art

Conventionally, in a film feeding apparatus of this type, an unexposed film in a cartridge is loaded in a camera by opening its rear cover. When the rear cover is closed, a motor is driven upon detection of this closing operation. Then, the film is successively wound up so that a frame to be exposed first is set to oppose an imaging lens (this wind-up operation is to be referred to as a preparatory wind-up operation hereinafter since this operation is performed to prepare for photography operation). The closing operation of the rear cover is detected by a detection means such as a switch which is operative in accordance with opening/closing of the rear cover.

However, according to the conventional film feeding apparatus, if the position of the switch is shifted from an ideal position, before the rear cover is completely closed, i.e., during the closing operation of the rear cover, the switch is operated and the preparatory wind-up operation starts. In this case, the film which is being wound up from the cartridge may be undesirably exposed by external light incident from a gap between the rear cover and the camera main body.

A prior art technique for resolving this problem is disclosed in Japanese Utility Model Disclosure No. 11989/1969. In the prior art technique, a lock device for locking the rear cover in the closing operation is interlocked with the rear cover detection switch. When the lock device completes the lock operation, the switch is operated. However, this technique results in a complex arrangement of the camera.

OBJECT OF THE INVENTION

It is an object of the present invention to provide a simple film feeding apparatus which will not undesirably expose a film even if the switch is operated before a rear cover is completely closed for the above-mentioned reason.

SUMMARY OF THE INVENTION

In order to achieve the above object of the present invention, there is provided a film feeding apparatus wherein preparatory wind-up starts not immediately after a close signal indicating that a rear cover is closed is generated, but after a predetermined delay time elapses from generation of the close signal, i.e., after the rear cover is completely closed.

BRIEF DESCRIPTION OF THE DRAWINGS

FIG. 4 is a flow chart showing the operation of the embodiment shown in FIG. 3.

DETAILED DESCRIPTION OF THE PREFERRED EMBODIMENTS

Figure 1:
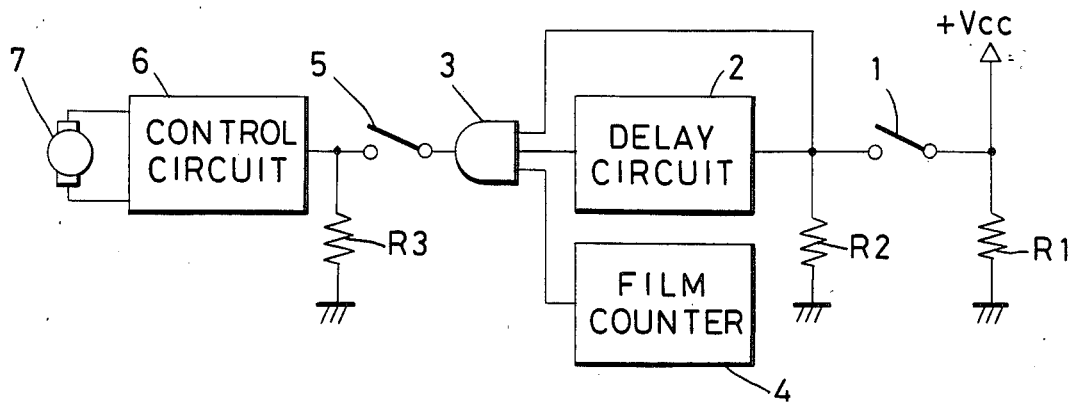
FIG. 1 is a block diagram showing an embodiment of the present invention.

FIG. 1 is a block diagram showing an apparatus according to an embodiment of the present invention.

An arrangement of FIG. 1 will be described first. A rear cover close detection switch 1 closes a switch contact upon detection of closing of a camera rear cover. A power source voltage +Vcc as a terminal voltage of a resistor R1 is applied to the primary side of the switch 1, and the voltage +Vcc supplies logic level H of a logic circuit to be described later. A resistor R2 is connected to the secondary side of the switch 1 as in the primary side.

A delay circuit 2 is energized in response to an H level input when the switch 1 is turned on, and generates a delay output which goes to H level after a preset constant delay time $\tau d$ passes. The delay circuit 2 has a reset function which cancels the delay operation when the switch 1 which has been turned on once is turned off again during the delay operation and an input goes to L level.

An AND gate 3 is connected to the delay circuit 2. The AND gate 3 receives the delay output from the delay circuit 2, the output from the switch 1 and an output from a film counter 4. The film counter 4 counts the number of frames for preparatory wind-up operation, and generates the H-level output until a frame to be exposed first opposes an imaging lens.

The output from the AND gate 3 is supplied to a motor control circuit 6 through a film detection switch 5. The film detection switch 5 is turned on when a film is loaded in the camera. Note that a resistor R3 for regulating logic level of a control signal supplied to the control circuit 6 is connected to the secondary side of the switch 5.

The motor control circuit 6 has a control function for driving a motor 7 for preparatory wind-up in response to the H-level output recieved from the AND gate 3 through the switch 5, i.e., the control signal. In addition to film preparatory wind-up control, the control circuit 6 has other functions such as film feed control for feeding the film for every frame during photography operation and rewind control after completing photography operation.

The operation of the apparatus according the embodiment shown in FIG. 1 will be described.

First, the rear cover of a camera is opened and a film cartridge is loaded therein. When the rear cover is closed after loading the film, the switch 1 is turned on upon detection of the closing of the rear cover. When the switch 1 is turned on, the delay circuit 2 is energized in response to the H-level switch output, thereby starting the delay operation. The H-level output from the switch 1 is directly supplied to the AND gate 3, and since a frame to be exposed first is not set to face the imaging lens, the H-level output is also supplied from the film counter 4 to the AND gate 3.

The delay circuit 2 generates the H-level output when the constant delay time $\tau d$ has elapsed after the switch 1 is turned on. Thus, since all the inputs of the AND gate 3 go to H level, the AND gate 3 supplies the H-level control signal to the motor control circuit 6 through the film detection switch 5 which is turned on. In response to the control signal, the control circuit 6 drives the motor 7, thus performing the preparatory wind-up operation.

The number of frames wound by the motor 7 is counted by the film counter 4. When the number of wound frames reaches a predetermined number and the frame to be exposed first faces the imaging lens, the output from the counter 4 goes to L level so as to disable the AND gate 3. Thus, the control signal supplied to the control circuit 6 is cut off, thus stopping the preparatory wind-up operation.

The preparatory wind-up operation is not started immediately after the rear cover is closed and the switch is turned on, but is started after the preset delay time τd has elapsed by the delay circuit 2. Therefore, even when the switch 1 is turned on before the rear cover is completely closed, the preparatory wind-up operation is not started at this time. Undesirable exposure of the film by light incident from a gap between the rear cover and the main body can be prevented until the rear cover is completely closed.

When the rear cover which has been closed once is opened again, since the switch contact of the switch 1 is opened, the delay circuit 2 in the delay operation is reset. Therefore, if the rear cover is erroneously opened, the preparatory wind-up operation cannot be started. Furthermore, if the rear cover is opened during the preparatory wind-up operation, the delay circuit 2 is reset in the same manner as described above. Thus, the AND gate 3 is disabled, the preparatory wind-up operation by the motor 7 can be interrupted, and an undesirably exposed area of the film can be suppressed to a minimum.

A circuit for directly inputting the output from the switch 1 to the AND gate 3 is a redundancy circuit for safety. Even if the delay circuit 2 is erroneously operated, as long as the rear cover is open, the preparatory wind-up operation is inhibited from being started by the redundancy circuit.

Figure 2:
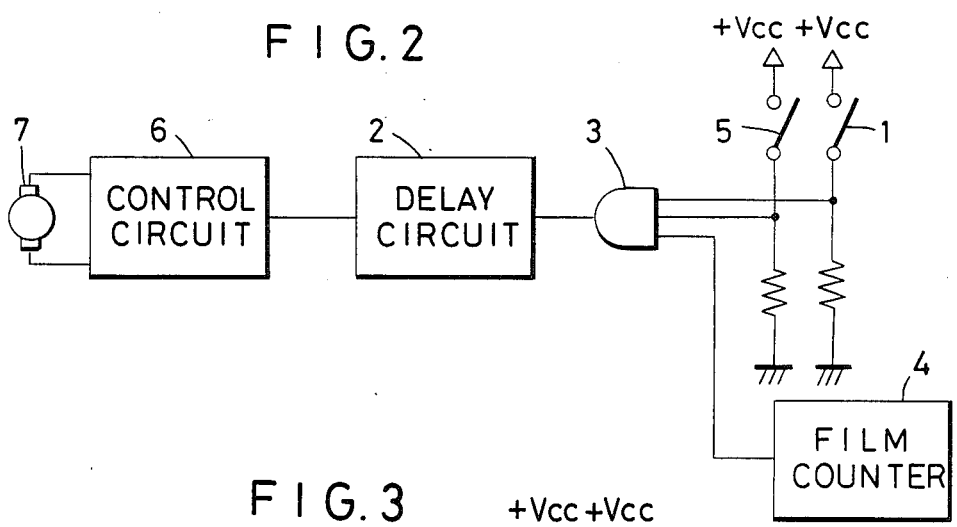
FIG. 2 is a block diagram showing another embodiment of the present invention.

FIG. 2 is a block diagram showing another embodiment of the present invention. This embodiment is characterized by delaying supply of a control signal to a motor control circuit which is obtained based upon establishment of preparatory wind-up conditions.

An AND gate 3 is connected to outputs from a rear cover close detection switch 1, a film detection switch 5 and a film counter 4. When the AND condition of the three outputs is established, a control signal is generated as the H-level output from the AND gate 3. A delay circuit 2 for delaying the control signal by a constant time τd is provided between the motor control circuit 6 and the AND gate 3. After the time τd has elapsed, the motor 7 is driven by the control circuit 6 for the preparatory wind-up operation.

When the output from the AND gate 3 goes to L level, the delay circuit 2 has a reset function. By the reset function, the delay operation is cancelled. In the state wherein the H-level output is generated after the delay operation, the output goes to L level, thus stopping the motor.

Figure 3:
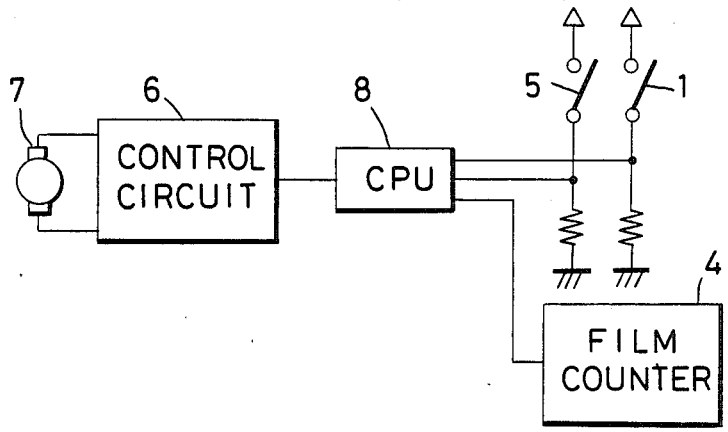
FIG. 3 is a block diagram showing still another embodiment of the present invention.

FIGS. 3 and 4 respectively show a block diagram and a flow chart of an embodiment using a microcomputer (CPU).

Referring to FIG. 3, a CPU 8 serves the same function as that of the delay circuit 2 and the AND gate 3 in the above embodiment.

The operation of this embodiment will be described with reference to FIG. 4. When a camera is powered, the CPU 8 awaits until the open rear cover is closed, i.e., the input from the switch 1 is changed from L to H level (step S1). When the input from the switch 1 goes to H level, the CPU 8 discriminates from an input from the film detection switch 5 if a film cartridge is loaded in the camera (step S2). If YES in step S2, i.e., when the film is loaded, since the input from the switch 5 is at H level, the CPU 8 causes an internal counter to start counting (step S3). However, if NO in step S2, since the input from the switch 5 is at L level, the flow ends. After the counter starts counting, the CPU 8 checks if a count is counted up (step S4). If NO in step S4, the CPU 8 discriminates from the level of input from the switch 1 if the rear cover is closed (step S5). Steps S4 and S5 form a loop, and this loop is repeated until YES in step S4 or NO in step S5. When NO is obtained in step S5, i.e., when the rear cover is opened during counting, the CPU 8 returns to step S1, and restarts the flow. When YES is obtained in step S4, i.e., when a count reaches a predetermined value, the CPU 8 supplies a control signal for enabling the preparatory wind-up operation to the motor control circuit 6 (step S6). The CPU checks if the frame to be exposed first faces the imaging lens, i.e., if the input from the film counter 4 changes from H to L level (step S7). If NO in step S7, the CPU 8 checks as in step S5 if the rear cover is closed (step S8). Steps S7 and S8 form a loop, and the loop is repeated until YES in step S7 or NO in step S8. If NO in step S8, i.e., when the rear cover is opened during the preparatory wind-up operation, the CPU 8 returns to step S1, and restarts the flow. In this case, since the CPU 8 stops generating the control signal for the preparatory wind-up operation, the preparatory wind-up operation by the motor control circuit 6 is interrupted. If YES in step S7, i.e., the frame to be exposed first faces the imaging lens, the CPU 8 stops generating the control signal so as to cause the motor control circuit 6 to stop the motor 7 (step S8).

Note that the delay time τd of the delay circuit 2 shown in FIGS. 1, 2 and 3 is set to be, e.g., about 0.5 seconds. In the above embodiment, the preparatory wind-up start conditions include detection of presence/absence of a film by the switch 5. However, in order to prevent the preparatory wind-up operation when no film is loaded, the preparatory wind-up start conditions can be determined only by the switch 1 and the counter 4.

Furthermore, the switch 1 can be either a switch which is mechanically operated by closing the rear cover, or a switch which is optically or magnetically operated by closing it. Thus, the type of the switch 1 is not particularly limited.

The preparatory wind-up operation referred to in the present invention means a continuous wind-up operation for causing a frame to be exposed first to face the imaging lens upon closing of the rear cover. Therefore, the preparatory wind-up operation is not limited to the above mentioned operation. As disclosed in U.S. Pat. No. 4,342,509, when a film is loaded in a camera and a rear cover is then closed, the entire unexposed film in a cartridge patrone is continuously wound up in advance up by a motor, and the film is rewound for each frame for each photography operation. The preparatory wind-up operation referred to in the present invention includes the continuous wind-up operation of the entire unexposed film prior to the photography operations disclosed in the above patent.

As described above, according to the present invention, in a film feeding apparatus for a camera which performs a preparatory wind-up operation by driving a motor upon detection of closing of a camera rear cover, a delay means for instructing to start the preparatory wind-up operation after a given delay time has elapsed from closing of the camera rear cover is provided. Therefore, if a rear cover detection switch is turned on before the rear cover is completely closed, the preparatory wind-up operation is not started immediately, and a film can be reliably prevented from being undesirably exposed with light incident from a gap of the closing rear cover. According to the preferred embodiments of the present invention, if the rear cover is opened again after it is closed, the preparatory wind-up operation is not started if the delay operation is being performed. When the rear cover is erroneously opened during the preparatory wind-up operation, the wind-up operation is interrupted, and an exposed area of the film can be suppressed to a minimum.

What we claimed is:

1. A film feeding apparatus for a camera to feed a film from a cartridge, comprising:

rear cover detection moans for detecting closing of a rear cover of a camera so as to generate a close signal;

a delay circuit which starts counting upon reception of the close signal and generates a delay signal after a predetermined time elapses from reception of the close signal; and feed means, including a motor, for energizing the motor upon reception of the delay signal so as to successively feed a film from the cartridge.

2. An apparatus according to claim 1, wherein said apparatus further includes;

feed detection means for detecting that a frame to be exposed first faces an imaging lens by continuous feeding operation by said feed means so as to generate a feed detection signal, and said feed means is inhibited from being operated upon reception of the feed detection signal, thereby disabling the continuous feeding operation.

3. An apparatus according to claim 1, wherein said apparatus further includes;

film detection means for detecting absence of the film in the camera so as to generate an absence signal, and said feed means is inhibited from operating said motor upon reception of the absence signal irrespective of the delay signal.

4. An apparatus according to claim 1, wherein said apparatus further includes;

film detection means for detecting absence of the film in the camera so as to generate an absence signal, and said delay circuit is inhibited from counting upon reception of the absence signal irrespective of the close signal.

5. An apparatus according to claim 1, wherein said delay circuit resets a counting operation and cannot generate the delay signal when the rear cover is opened during the counting operation and the close signal is disabled.

6. An apparatus according to claim 1, wherein said delay circuit stops generating the delay signal when the rear cover is opened and the close signal is disabled while the delay signal is generated, and said feed means stops said motor so as to interrupt the feeding of the film when the delay signal is disabled.

7. An apparatus according to claim 1, wherein said feed means stops said motor, thereby disabling the feeding of the film.

8. A film feeding apparatus for a camera to feed a film from a cartridge, comprising:

rear cover detection means for detecting the closing of a rear cover of said camera so as to generate a close signal;

a delay circuit responsive to said close signal for counting a predetermined time and generating a delay signal after said predetermined time is counted;

a motor for feeding said film from said cartridge; and energizing means responsive to said delay signal for energizing said motor so that said motor starts feeding said film from said cartridge.

9. An apparatus according to claim 8, which further comprises feed detection means for detecting that a first frame of said film to be exposed faces an imaging lens and thereafter producing a feed detection signal, wherein said energizing means inhibits said motor from feeding said film from said cartridge in response to said feed detection signal.

10. An apparatus according to claim 8, which further comprises film detection means for detecting the absence of said film in the camera so as to generate an absence signal, and wherein said energizing means inhibits said motor from feeding said film from said cartridge in response to said absence signal irrespective of said delay signal.

11. An apparatus according to claim 8, which further comprises film detection means for detecting the absence of said film in the camera so as to generate an absence signal and means for inhibiting said delay circuit from counting said predetermined time in response to said absence signal irrespective of said close signal.

12. An apparatus according to claim 8, wherein said delay circuit stops counting said predetermined time in response to opening of said rear cover.

* * * * *